June 4, 1968   R. I. JENKINSON   3,386,155
METHOD OF FITTING SEAL RINGS TO BLADES
Filed July 1, 1963   4 Sheets-Sheet 1

INVENTOR.
RICHARD I. JENKINSON
BY
Raymond A. Paquin
ATTORNEY.

June 4, 1968  R. I. JENKINSON  3,386,155
METHOD OF FITTING SEAL RINGS TO BLADES
Filed July 1, 1963  4 Sheets-Sheet 2
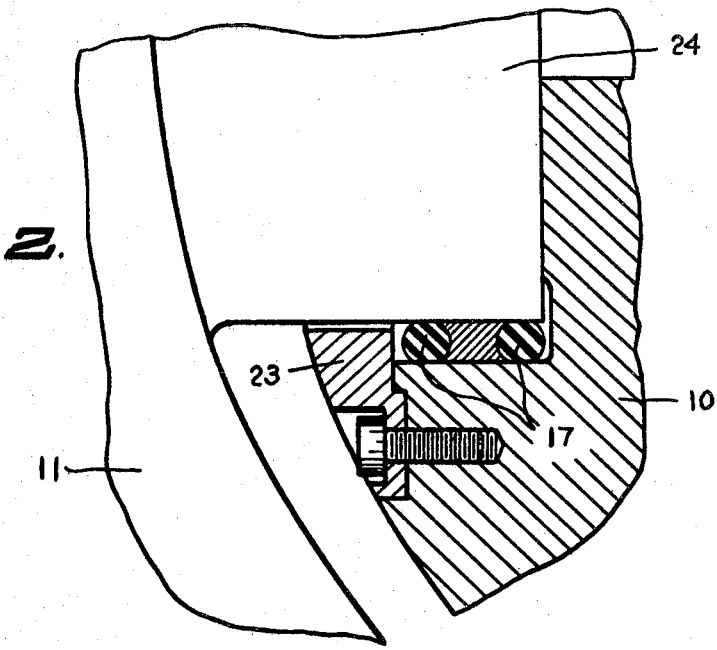
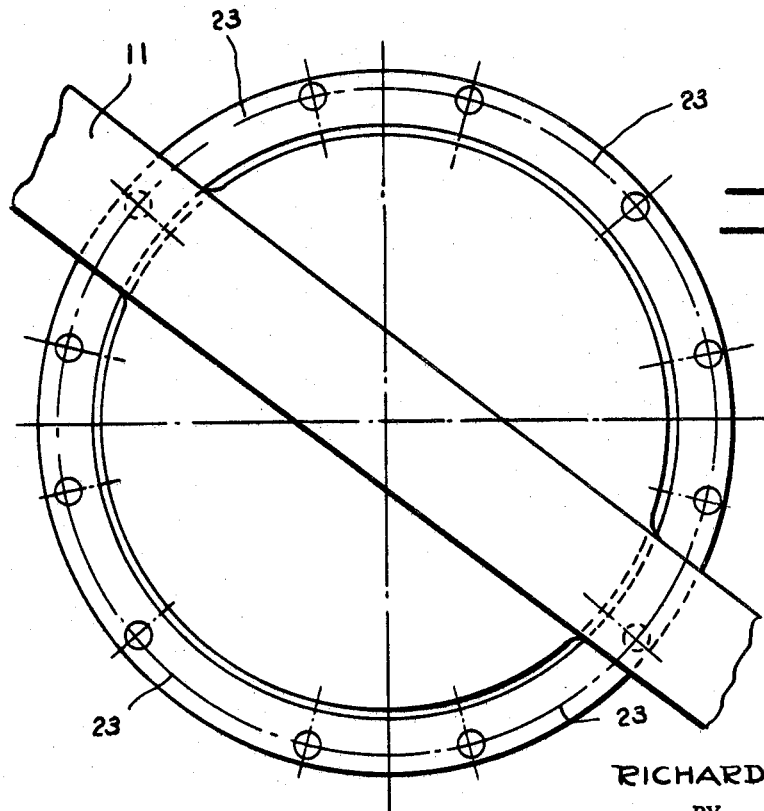
INVENTOR.
RICHARD I. JENKINSON
BY
ATTORNEY.

June 4, 1968 R. I. JENKINSON 3,386,155
METHOD OF FITTING SEAL RINGS TO BLADES
Filed July 1, 1963 4 Sheets-Sheet 3
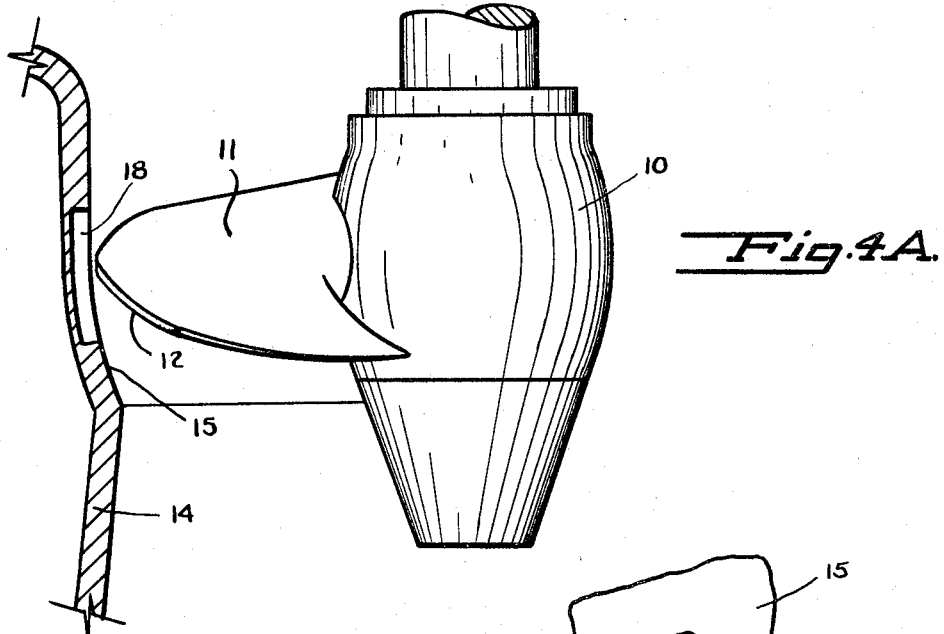
Fig. 4A.
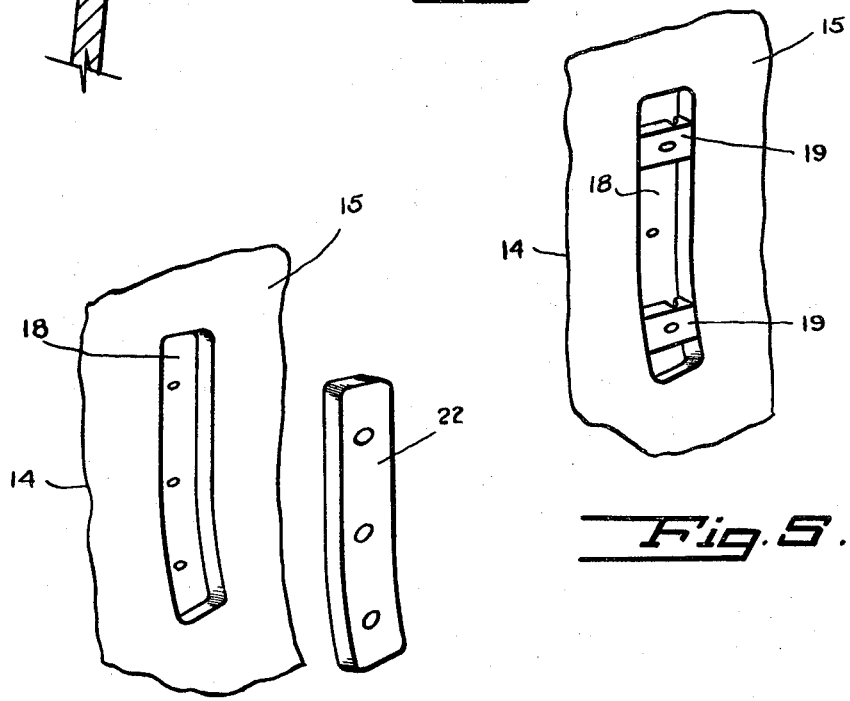
Fig. 5.
Fig. 6.
INVENTOR.
RICHARD I. JENKINSON
BY
ATTORNEY.

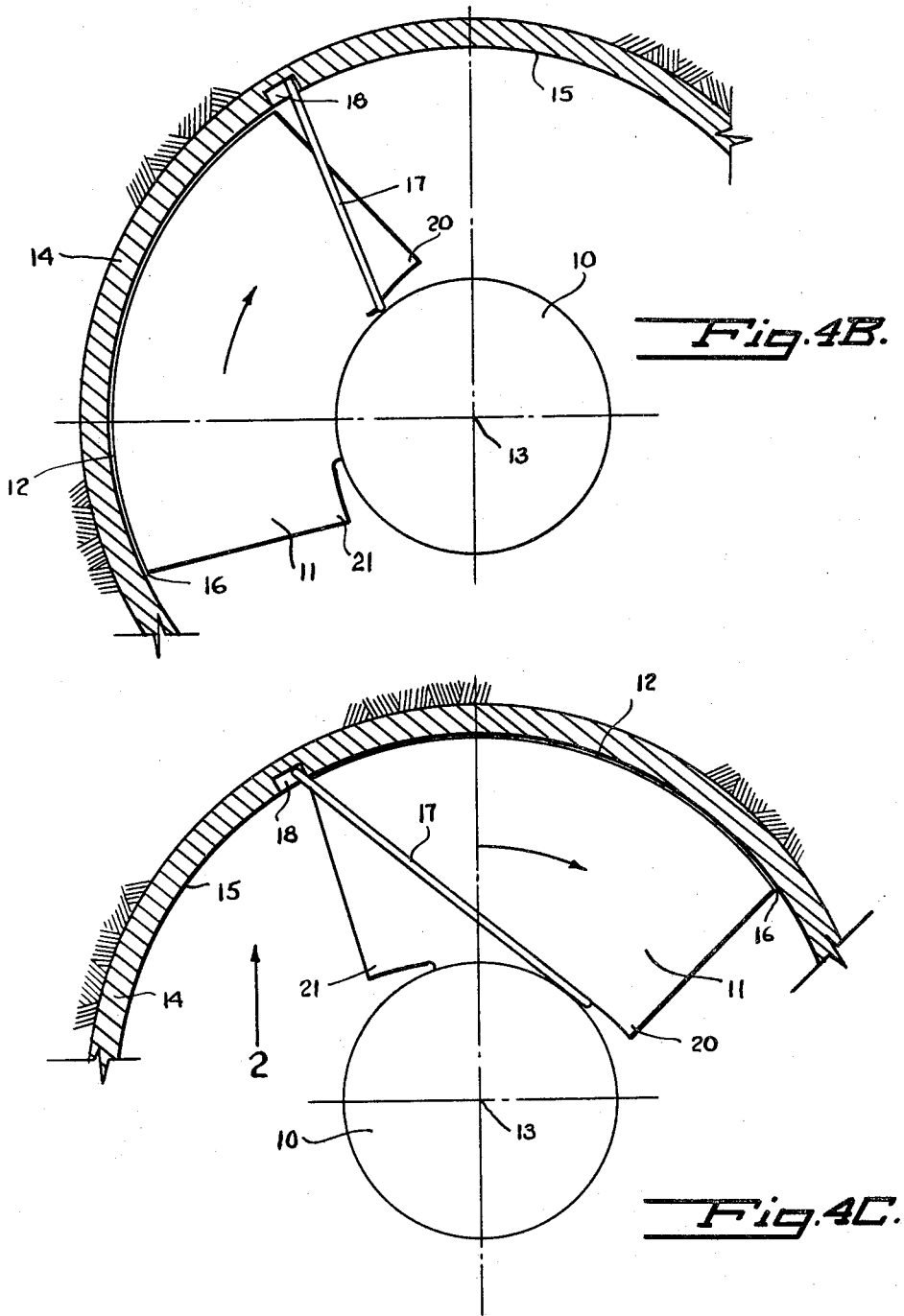

United States Patent Office 3,386,155
Patented June 4, 1968

3,386,155
METHOD OF FITTING SEAL RINGS
TO BLADES
Richard I. Jenkinson, Lachine, Quebec, Canada, assignor
to Dominion Engineering Works, Limited
Filed July 1, 1963, Ser. No. 291,700
9 Claims. (Cl. 29—401)

This invention relates to axial flow hydraulic turbomachines of the Kaplan type and has reference to the provision of new and improved method of replacing damaged seal ring to resilient, deformable, endless type which are usually fitted between the rotor blade trunnions and the rotor hub and which seal the blade actuating mechanism normally contained in the hub, without removing the rotor or any of the rotating mechanism from its operating position. More particularly, this invention is applicable to Kaplan type machines which have a relatively small running clearance between the peripheries of the blades and the bore of the throat ring, the radial clearance of which is less than the cross-sectional area of the seal ring.

Conventionally when a continuous seal ring is to be replaced in an axial flow turbo-machine such as, for example, a Kaplan type turbine or the like, the entire rotor assembly is removed from the machine or, a joint is made in a length of seal material which has first been passed around the blade trunnion.

Both of these sealing methods, however, possess serious disadvantages and deficiencies.

With regard to the method requiring the removal of the entire rotor assembly from the machine, such requires the expenditure of large amounts of time and money and is, in short, expensive.

With regard to the method requiring that a joint be made in the seal, such is subject to gerat difficulty in producing a satisfactory joint in some sealing materials, particularly in the field.

An object of the present invention is to provide new and improved method for enabling the replacement of continuous seal rings in the blade trunnion to rotor hub seal of an axial flow turbo-machine such as a Kaplan type turbine or the like, particularly when the rotor blade tip to throat clearance is too small to allow passage therethrough of the sealing member and it is not desirable to remove the rotor from the unit.

Another object of the invention is to provide new and improved method of the type set forth which enables the replacement of the sealing member without making a spliced joint in the seal material.

Another object is to provide new and improved method of the type set forth which enables the sealing member to be installed or replaced without requiring that the rotor of the machine be removed from the remainder thereof.

Other objects and advantages of the invention will be apparent from the following description taken in connection with the accompanying drawings. It will be understood that changes may be made in the details of construction and arrangement of parts shown and described as the preferred form of the invention has been given by way of illustration only.

Referrings to the drawings:

FIG. 2 is an enlarged sectional view of that portion of FIG. 1 shown encircled and illustrates two seal rings in their normal position;

FIG. 3 is an end view of the blade shown in FIG. 2 and illustrates details of the segmented seal retaining ring;

FIG. 4A is a fragmentary view of the Kaplan turbine shown in FIG. 1 illustrating a blade thereof in combination with the present invention;

FIG. 4B is a top view of the turbine shown in FIG. 4A showing the replacement seal ring in relation thereto and prior to rotation;

FIG. 4C is a top view of the turbine blade shown in FIG. 4B showing such in after rotation position;

FIG. 5 is a perspective fragmentary view of the throat ring wall taken in the direction of arrow 2 in FIG. 4C and showing a slot therein in accordance with the present invention; and FIG. 6 is a view of the throat ring wall generally similar to that of FIG. 5 but showing also the removable closure member for said slot.

Figure 1:
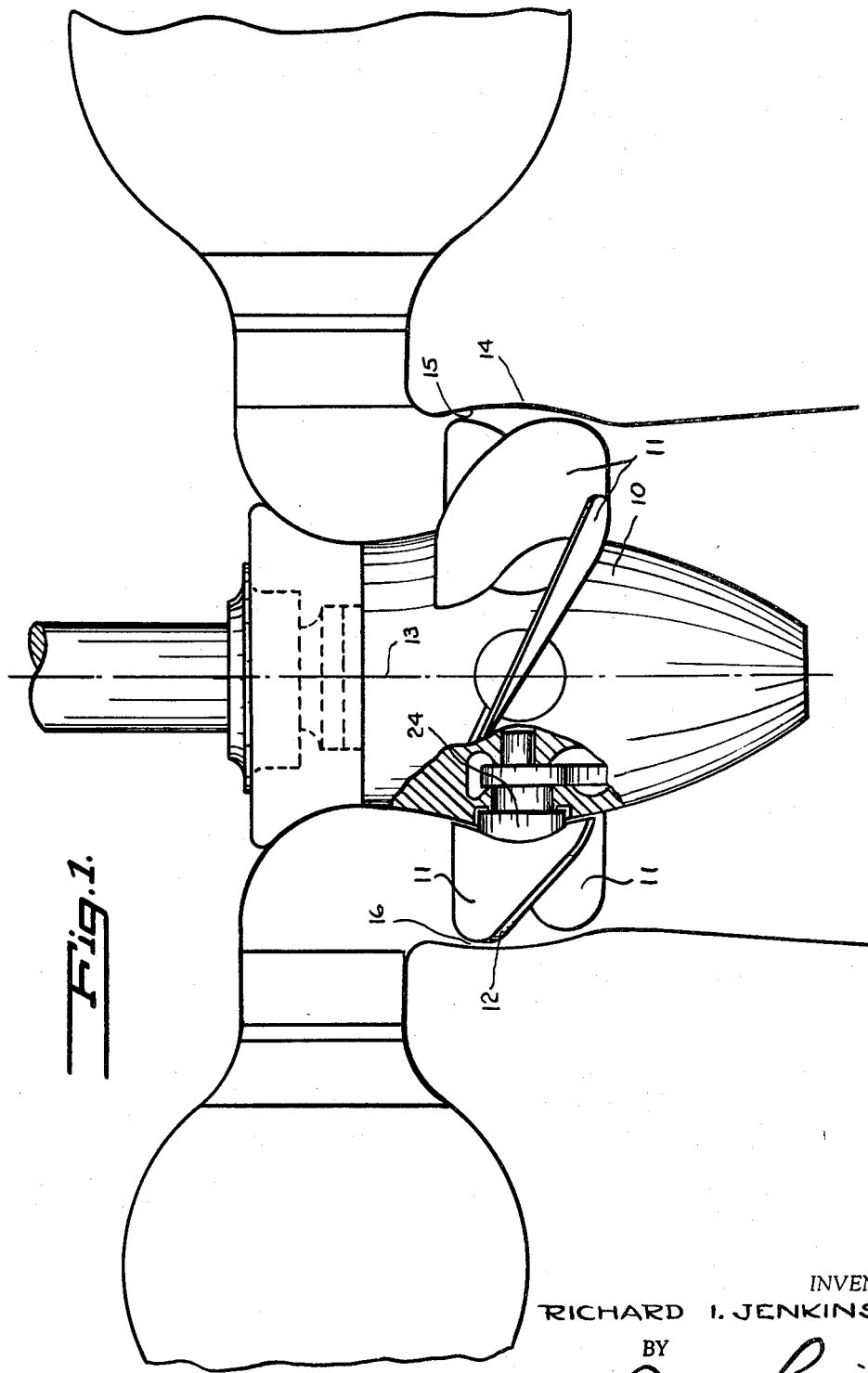
FIG. 1 is a partially sectional diametral view of a Kaplan type turbine embodying the invention.

Referring more particularly to the drawings wherein similar reference characters designate corresponding parts throughout the several views, with particular reference to FIG. 1, the device shown therein comprises a Kaplan type turbine which includes a rotor or runner hub 10 in which are mounted by means of trunnions 24 a series of blades 1, the periphery 12 of each blade 11 being concentric with the center of rotation 13 of the runner hub 10.

A throat ring 13 surrounds runner hub 10 and blades 11 the bore 15 of throat ring 14 being concentric with the center of rotation 13 of runner hub 10, leaving a small annular clearance 16 between the peripheries 12 of blades 11 and throat ring 14.

With reference now to FIGS. 2 and 3, at least one resilient seal ring 17 is provided for each trunnion 24 of blades 11. Seal ring 17 protects the mechanism contained in hub 10 from the surrounding water; they are held in place and made accessible by means of removable segmental seal retaining rings 23.

On occasion, it is necessary to replace one or more of seal rings 17 which have become damaged. Conventionally, when the small annular clearance 16 is of smaller radial dimension than the cross-sectional area of said seal rings, either the entire rotating assembly is removed from the turbine or the seal ring 17 to be installed is first split and then rejoined in its proper sealing position.

However, the means herein provided permit the replacement of one or more of said seal rings without requiring that either the rotating assembly be removed from the turbine or that the seal ring 17 to be installed be split and then rejoined by means of a field joint or the like.

In accordance with the present invention, a slot 18 is formed in the wall or inner surface 15 of the throat ring 14, said slot being of such length in the axial direction as to be greater than any portion of the tip of blade 11 when set in fine pitch.

In the replacement of a seal ring 17, the runner hub 10 is positioned so that one edge of blade 11 on which said seal ring is to be installed is adjacent to slot 18, as shown in FIG. 4B.

It will be understood that the machine has been closed down and is inoperative during replacement of seal ring 17 and that the segmental seal retaining ring 23 has been removed.

Replacement seal ring 17 which is to be installed is then placed in slot 18 and held there by two or more cleats or the like 19, as shown in FIG. 5. Said seal ring is hooked over the inner corner 20 of the blade 11 and the runner hub 10 is rotated until the other edge of said blade has passed slot 18, as is shown in FIG. 4C.

Cleats or the like 19 may then be unscrewed, thus, permitting the seal ring 17 to be removed from slot 18 to a position where it can readily be passed over the corner 21 of blade 11 to its required position around trunnion 24.

Due to the fact that seal ring 17 is comprised of rubber or other resilient material, said seal ring will have no difficulty in stretching as the blade 11 is rotated during the foredescribed installation process and will, furthermore, return to its original proper length once freed from slot 18.

When slot 18 is not in use in the foredescribed manner, it may be filled by a plate or other suitable closure member 22 secured therein by means of screws, welds, or other means, as is shown in FIG. 6 of the drawings.

It will be understood that the present invention may be utilized on turbines not initially equipped with a slot 18, in which case, said slot may be produced in said turbine by any readily available method and then, after use, welded up or otherwise closed.

It will be readily apparent from the foregoing description that one slot 18 may be sufficient to service all of the blades 11. However, should such be desired, all of said blades could be simultaneously serviced if the number of said slots is made to correspond to the number of said blades and said slots are properly positioned in the turbine.

Furthermore, slot 18 may, also, be made to accommodate more than one seal ring 11 should multiple seals be utilized and should it be desired that such be replaced simultaneously.

From the foregoing it will be seen that I have provided new and improved means for enabling the replacement of a seal ring of the type set forth in the Kaplan turbine or the like without either removing the entire runner from the turbine or splitting the seal ring and then making a field joint therein when it is placed in its operative or sealing position, which means is particularly adapted for use where the space of clearance between the blade tips and the throat ring is too small to permit passage of said ring seal therethrough, as well as a new and improved method for replacing said seal ring.

From the foregoing it will be seen that I have provided new and improved means for accomplishing all of the objects and advantages of the invention.

I claim:

1. The method of installing a resilient seal ring around a blade of an axial flow turbo-machine having a bladed rotor and a surrounding static structure and wherein the radial distance between the tip of the blade and said stationary structure is less than the thickness of said seal ring comprising, forming a slot in the wall of the stationary structure, positioning the rotor such that one edge of the blade is adjacent said slot, placing the seal ring in said slot and passing said seal ring over one corner of the blade, rotating the rotor until the blade has passed said slot and passing said seal ring over the other corner of said blade.

2. The method of installing a resilient seal ring around a blade of an axial flow turbo-machine having a bladed rotor and a surrounding static structure and wherein the radial distance between the tip of the blade and said stationary structure is less than the thickness of said seal ring comprising, forming a slot in the wall of the stationary structure, positioning the rotor such that one edge of the blade is adjacent said slot, placing the seal ring in said slot and passing said seal ring over one corner of the blade, rotating the rotor until the blade has passed said slot and passing said seal ring over the other corner of said blade, and filling said slot with a removable insert.

3. The method of installing a resilient seal ring around a blade of an axial flow turbo-machine having a bladed rotor and a surrounding static structure and wherein the radial distance between the tip of the blade and said stationary structure is less than the thickness of said seal ring comprising, forming a slot in the inner wall of the stationary structure, positioning the rotor such that one edge of the blade is adjacent said slot, placing the seal ring in said slot and passing said seal ring over one corner of the blade, rotating the rotor until the blade has passed said slot and passing said seal ring over the other corner of said blade.

4. The method of installing a resilient seal ring around a blade of an axial flow turbo-machine having a bladed rotor and a surrounding static structure and wherein the radial distance between the tip of the blade and said stationary structure is less than the thickness of said seal ring comprising, forming a slot in the inner wall of the stationary structure, positioning the rotor such that one edge of the blade is adjacent said slot, placing the seal ring in said slot and passing said seal ring over one corner of the blade, rotating the rotor until the blade has passed said slot and passing said seal ring over the other corner of said blade, and filling said slot with a removable insert flush with the remainder of the inner wall of said stationary structure.

5. The method of installing a resilient seal ring around a blade of an axial flow turbo-machine having a bladed rotor and a surrounding static structure and wherein the radial distance between the tip of the blade and said stationary structure is less than the thickness of said real ring comprising, forming a slot in that portion of the inner wall of the stationary structure swept by the tips of the blades, positioning the rotor such that one edge of the blade is adjacent said slot, placing the seal ring in said slot and passing said seal ring over one corner of the blade, rotating the rotor until the blade has passed said slot and passing said seal ring over the other corner of said blade.

6. The method of installing a resilient seal ring around a blade of an axial flow turbo-machine having a bladed rotor and surrounding static structure and wherein the radial distance between the tip of the blade and said stationary structure is less than the thickness of said real ring comprising, forming a slot in the wall of the stationary structure, the major dimension of said slot being substantially parallel with the axis of rotation of the rotor, positioning the rotor such that one edge of the blade is adjacent said slot, placing the seal ring in said slot and passing said seal ring over one corner of the blade, rotating the rotor until the blade has passed said slot and passing said seal ring over the other corner of said blade.

7. The method of installing a resilient seal ring around a blade of an axial flow turbo-machine having a bladed rotor and a surrounding static structure and wherein the radial distance between the tip of the blade and said stationary structure is less than the thickness of said seal ring comprising, forming a slot in the wall of the stationary structure, the major dimension of said slot being substantially parallel with the axis of rotation of the rotor, and being substantially the same as the width of the path swept by said blade tip when said blade is set at its minimum pitch angle, positioning the rotor such that one edge of the blade is adjacent said slot, placing the seal ring in said slot and passing said seal ring over one corner of the blade, rotating the rotor until the blade has passed said slot and passing said seal ring over the other corner of said blade.

8. The method of installing a resilient seal ring around a blade of an axial flow turbo-machine having a bladed rotor and a surrounding static structure and wherein the radial distance between the tip of the blade and said stationary structure is less than the thickness of said seal ring comprising, forming a slot in the wall of the stationary structure, the major dimension of said slot being substantially parallel with the axis of rotation of the rotor, and slightly greater than the width of the path swept by said blade tip when said blade is at its minimum pitch angle, positioning the rotor such that one edge of the blade is adjacent said slot, placing the seal ring in said slot and passing said seal ring over one corner of the blade, rotating the rotor until the blade has passed said slot and passing said seal ring over the other corner of said blade.

9. The method of installing a resilient seal ring around a blade of an axial flow turbo-machine having a bladed rotor and a surrounding static structure and wherein the radial distance between the tip of the blade and said stationary structure is less than the thickness of said seal ring comprising, forming a slot in the wall of the stationary structure, the major dimension of said slot being substantially parallel with the axis of rotation of the rotor, and being substantially the same as the width of the path swept by said blade tip and slightly greater than the width of the path swept by said blade tip when said blade is at its minimum pitch angle, positioning the rotor such that one edge of the blade is adjacent said slot, placing the seal ring in said slot and passing said seal ring over one corner of the blade, rotating the rotor until the blade has passed said slot and passing said seal ring over the other corner of said blade.

References Cited

UNITED STATES PATENTS

| | | | |
|---|---|---|---|
| 3,137,933 | 6/1964 | Hitchcock et al. | 29—401 |
| 3,145,463 | 8/1964 | Hockett | 29—451 |
| 3,176,960 | 4/1965 | Sproule | 253—148 |
| 3,180,015 | 4/1965 | Thompson et al. | 29—451 X |
| 3,183,587 | 5/1965 | Baskell | 29—451 |
| 2,739,374 | 3/1956 | Kaiser | 29—450 |
| 2,977,994 | 4/1961 | Xenis | 29—450 |
| 3,059,330 | 10/1962 | Blair | 29—450 X |
| 2,739,374 | 3/1956 | Kaiser | 29—450 |
| 2,793,428 | 5/1957 | Witte | 29—451 |
| 2,284,295 | 5/1942 | Moody | 253—148 |
| 2,776,107 | 1/1957 | Willi | 253—148 |

CHARLIE T. MOON, *Primary Examiner.*

W. A. WILTZ, *Examiner.*